United States Patent
Binkley et al.

(10) Patent No.: US 11,062,043 B2
(45) Date of Patent: Jul. 13, 2021

(54) DATABASE ENTITY SENSITIVITY CLASSIFICATION

(71) Applicant: Optum, Inc., Minnetonka, MN (US)

(72) Inventors: Daniel L. Binkley, Burlington, CT (US); Okja Kim, Newton, MA (US)

(73) Assignee: Optum, Inc., Minnetonka, MN (US)

( * ) Notice: Subject to any disclaimer, the term of this patent is extended or adjusted under 35 U.S.C. 154(b) by 128 days.

(21) Appl. No.: 16/400,476

(22) Filed: May 1, 2019

(65) Prior Publication Data

US 2020/0349271 A1   Nov. 5, 2020

(51) Int. Cl.
*G06F 21/00*   (2013.01)
*G06F 21/62*   (2013.01)
*G06N 20/00*   (2019.01)

(52) U.S. Cl.
CPC ......... *G06F 21/6218* (2013.01); *G06N 20/00* (2019.01)

(58) Field of Classification Search
CPC .............................. G06F 21/6218; G06N 20/00
See application file for complete search history.

(56) References Cited

U.S. PATENT DOCUMENTS

| | | | |
|---|---|---|---|
| 6,202,066 B1 | 3/2001 | Barkley et al. | |
| 6,732,113 B1 | 5/2004 | Ober et al. | |
| 8,738,605 B2 | 5/2014 | Devarajan et al. | |
| 9,489,376 B2 | 11/2016 | Thomason et al. | |
| 9,628,493 B2 | 4/2017 | Warshavsky et al. | |
| 9,691,027 B1 | 6/2017 | Sawant et al. | |
| 9,785,795 B2 | 10/2017 | Grondin et al. | |
| 2003/0101341 A1 | 5/2003 | Kettler et al. | |
| 2008/0162499 A1 | 7/2008 | Connor et al. | |
| 2013/0332194 A1 | 12/2013 | D'Auria et al. | |

(Continued)

FOREIGN PATENT DOCUMENTS

| | | |
|---|---|---|
| EP | 2663053 A2 | 11/2013 |
| WO | 2016/064470 A1 | 4/2016 |

OTHER PUBLICATIONS

"Collibra Data Governance Center," Collibra, [online], (9 pages), [Retrieved From the Internet Jun. 25, 2019] <https://www.collibra.com/data-governance-solutions/data-governance-center>.

(Continued)

*Primary Examiner* — Jeffrey C Pwu
*Assistant Examiner* — Rodman Alexander Mahmoudi
(74) *Attorney, Agent, or Firm* — Alston & Bird LLP

(57) ABSTRACT

There is a need for solutions that perform entity sensitivity classification for a database entity associated with plurality of database elements. This need can be addressed by, for example, for each database element, generating element tokens for the database element based on a textual identifier for the database element, generating token combinations for the database element based on the element tokens for the database element and a token order associated with the textual identifier, generating a token-combination document for the database element based on the token combinations for the database element, and generating element feature data for the database element based on the token-combination document for the database element, and determining the entity sensitivity classification on each element feature data associated with a database element of the plurality of database elements and using a sensitivity classification model.

17 Claims, 9 Drawing Sheets

(56) References Cited

U.S. PATENT DOCUMENTS

| | | |
|---|---|---|
| 2015/0142811 A1* | 5/2015 | Henry ................. G06F 16/285 |
| | | 707/738 |
| 2015/0161397 A1 | 6/2015 | Cook et al. |
| 2017/0091279 A1 | 3/2017 | Shah et al. |
| 2017/0124176 A1 | 5/2017 | Beznos et al. |
| 2017/0208041 A1 | 7/2017 | Kho et al. |
| 2017/0287029 A1 | 10/2017 | Barday |
| 2017/0287059 A1 | 10/2017 | Shelksohn et al. |
| 2018/0027006 A1 | 1/2018 | Zimmermann et al. |
| 2018/0075254 A1 | 3/2018 | Reid et al. |
| 2018/0232528 A1 | 8/2018 | Williamson et al. |
| 2018/0309775 A1 | 10/2018 | Zou et al. |
| 2019/0258854 A1* | 8/2019 | Hosabettu ................ G06K 9/66 |

OTHER PUBLICATIONS

Combined Search and Examination Report for Great Britain Patent Application No. 1914329.6, dated Mar. 19, 2020, (5 pages), United Kingdom Intellectual Property Office, Oslo, Norway.

Intellectual Property Office, Intention to Grant for Great Britain Patent Application No. GB1914329.6, dated Oct. 12, 2020, (2 pages), South Wales, Great Brtiain.

Office Action for U.S. Appl. No. 16/592,134, dated Feb. 4, 2021, (292 pages), United States Patent and Trademark Office, USA.

Final Office Action for U.S. Appl. No. 16/592,134, dated May 18, 2021, (16 pages), United States Patent and Trademark Office, USA.

\* cited by examiner

| SOC_SEC_NUM | 611 PHNE_NUM | 612 ADDR | 613 |

620

| SOC_SEC | 621 PATIENT_NUM | 622 DIAGNOSIS | 623 |

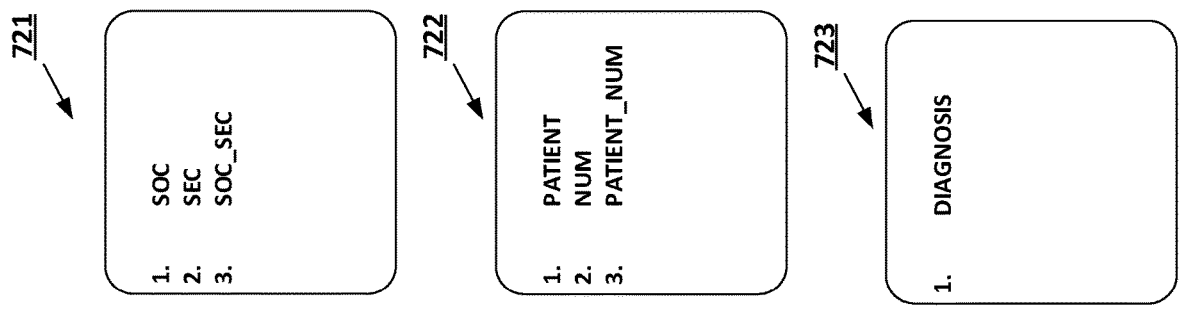
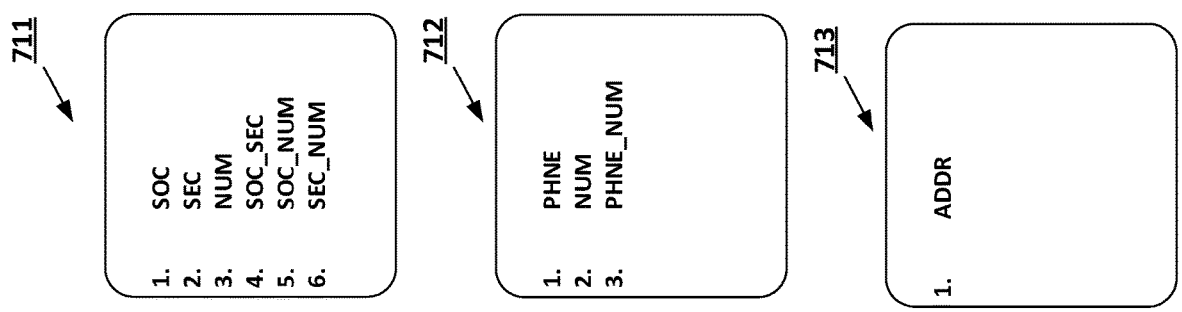
FIG. 7

507 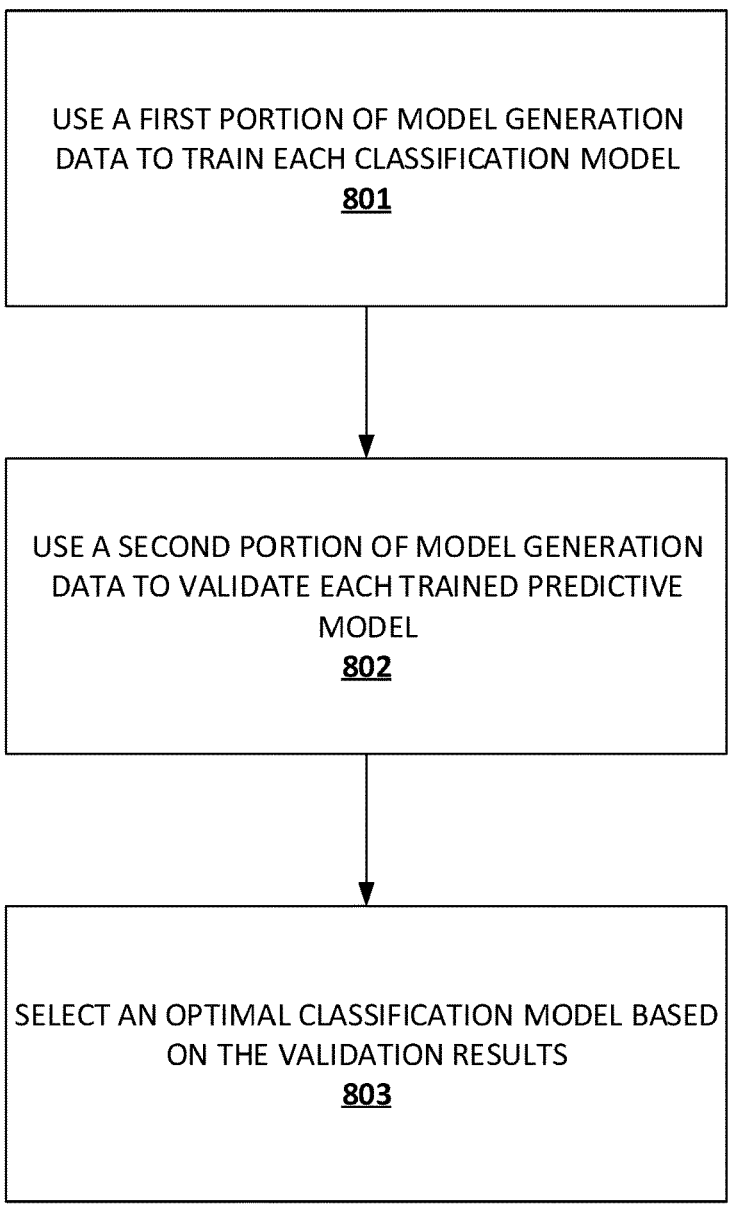

```
┌─────────────────────────────────────┐
│ USE A FIRST PORTION OF MODEL        │
│ GENERATION DATA TO TRAIN EACH       │
│ CLASSIFICATION MODEL                │
│ 801                                 │
└─────────────────────────────────────┘
              │
              ▼
┌─────────────────────────────────────┐
│ USE A SECOND PORTION OF MODEL       │
│ GENERATION DATA TO VALIDATE EACH    │
│ TRAINED PREDICTIVE MODEL            │
│ 802                                 │
└─────────────────────────────────────┘
              │
              ▼
┌─────────────────────────────────────┐
│ SELECT AN OPTIMAL CLASSIFICATION    │
│ MODEL BASED ON THE VALIDATION       │
│ RESULTS                             │
│ 803                                 │
└─────────────────────────────────────┘
```

FIG. 8

DATABASE ENTITY SENSITIVITY CLASSIFICATION

BACKGROUND

Various embodiments of the present invention address technical challenges related to database entity sensitivity classification in large and complex database systems. Many institutions deal with data that can include potentially sensitive information/data. In many cases, such institutions need to determine what data in a database is sensitive and what data is not. This could be a difficult task that requires substantial predictive inference, especially as the size and complexity of data stored in a database grows. For example, many healthcare delivery and/or health insurance delivery institutions host large-scale databases with potentially sensitive information/data such as patient health information/data and patient identifying information/data. For many of those healthcare delivery and/or health insurance delivery institutions, it is imperative to uphold company policies in the management of sensitive information/data by properly identifying sensitive information/data.

BRIEF SUMMARY

In general, embodiments of the present invention provide methods, apparatus, systems, computing devices, computing entities, and/or the like for database entity sensitivity classification. Certain embodiments utilize systems, methods, and computer program products that enable entity sensitivity classification by using database element identifiers (e.g., relational database column names) associated with database entities (e.g., relational database tables).

In accordance with one aspect, a method is provided. In one embodiment, the method comprises: (i) for each database element of a plurality of database elements: generating one or more element tokens based at least in part on a textual identifier for the database element, generating one or more token combinations based at least in part on the one or more element tokens for the database element and a token order associated with the textual identifier, generating a token-combination document based at least in part on the one or more token combinations for the database element, and generating element feature data for the database element based at least in part on the token-combination document for the database element; and (ii) determining an entity sensitivity classification for a database entity comprising the plurality of database elements based at least in part on each element feature data associated with a database element of the plurality of database elements and using a sensitivity classification model.

In accordance with another aspect, a computer program product is provided. The computer program product may comprise at least one computer-readable storage medium having computer-readable program code portions stored therein, the computer-readable program code portions comprising executable portions configured to: (i) for each database element of a plurality of database elements: generate one or more element tokens based at least in part on a textual identifier for the database element, generate one or more token combinations based at least in part on the one or more element tokens for the database element and a token order associated with the textual identifier, generate a token-combination document based at least in part on the one or more token combinations for the database element, and generate element feature data for the database element based at least in part on the token-combination document for the database element; and (ii) determine an entity sensitivity classification for a database entity comprising the plurality of database elements based at least in part on each element feature data associated with a database element of the plurality of database elements and using a sensitivity classification model.

In accordance with yet another aspect, an apparatus comprising at least one processor and at least one memory including computer program code is provided. In one embodiment, the at least one memory and the computer program code may be configured to, with the processor, cause the apparatus to: (i) for each database element of a plurality of database elements: generate one or more element tokens based at least in part on a textual identifier for the database element, generate one or more token combinations based at least in part on the one or more element tokens for the database element and a token order associated with the textual identifier, generate a token-combination document based at least in part on the one or more token combinations for the database element, and generate element feature data for the database element based at least in part on the token-combination document for the database element; and (ii) determine an entity sensitivity classification for a database entity comprising the plurality of database elements based at least in part on each element feature data associated with a database element of the plurality of database elements and using a sensitivity classification model.

BRIEF DESCRIPTION OF THE DRAWINGS

Figure 1:
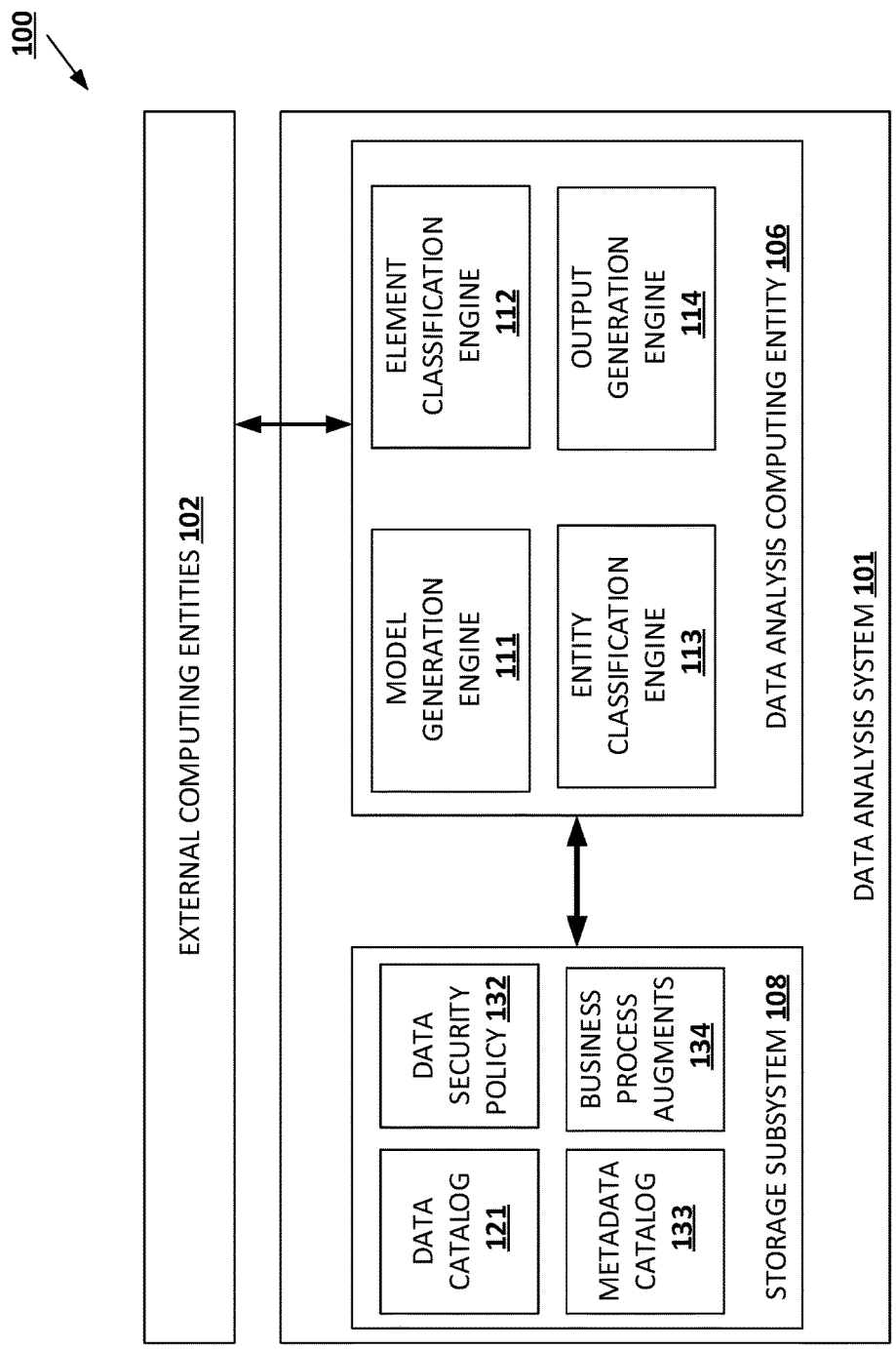

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
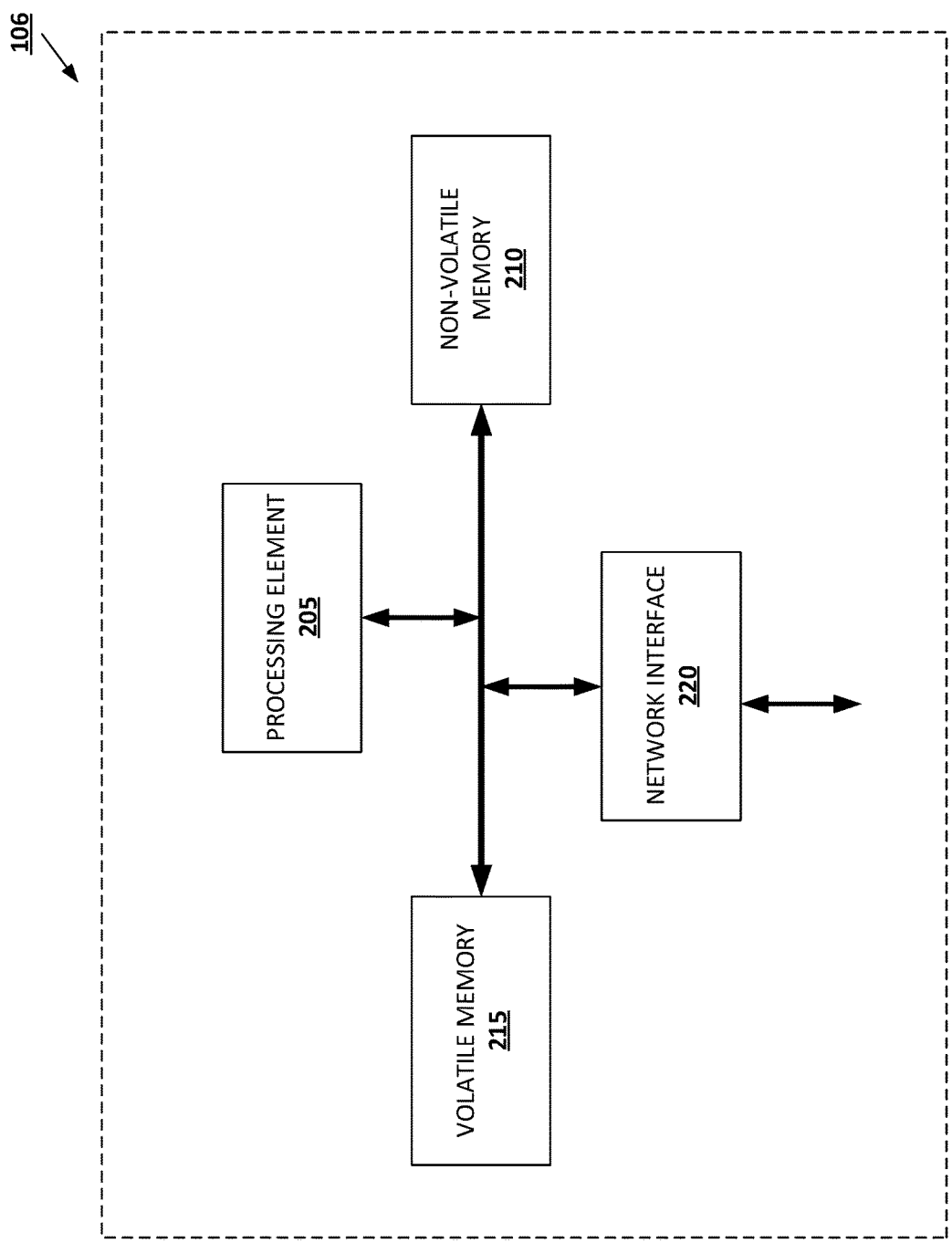

FIG. 2 provides an example data analysis computing entity in accordance with some embodiments discussed herein.

Figure 3:
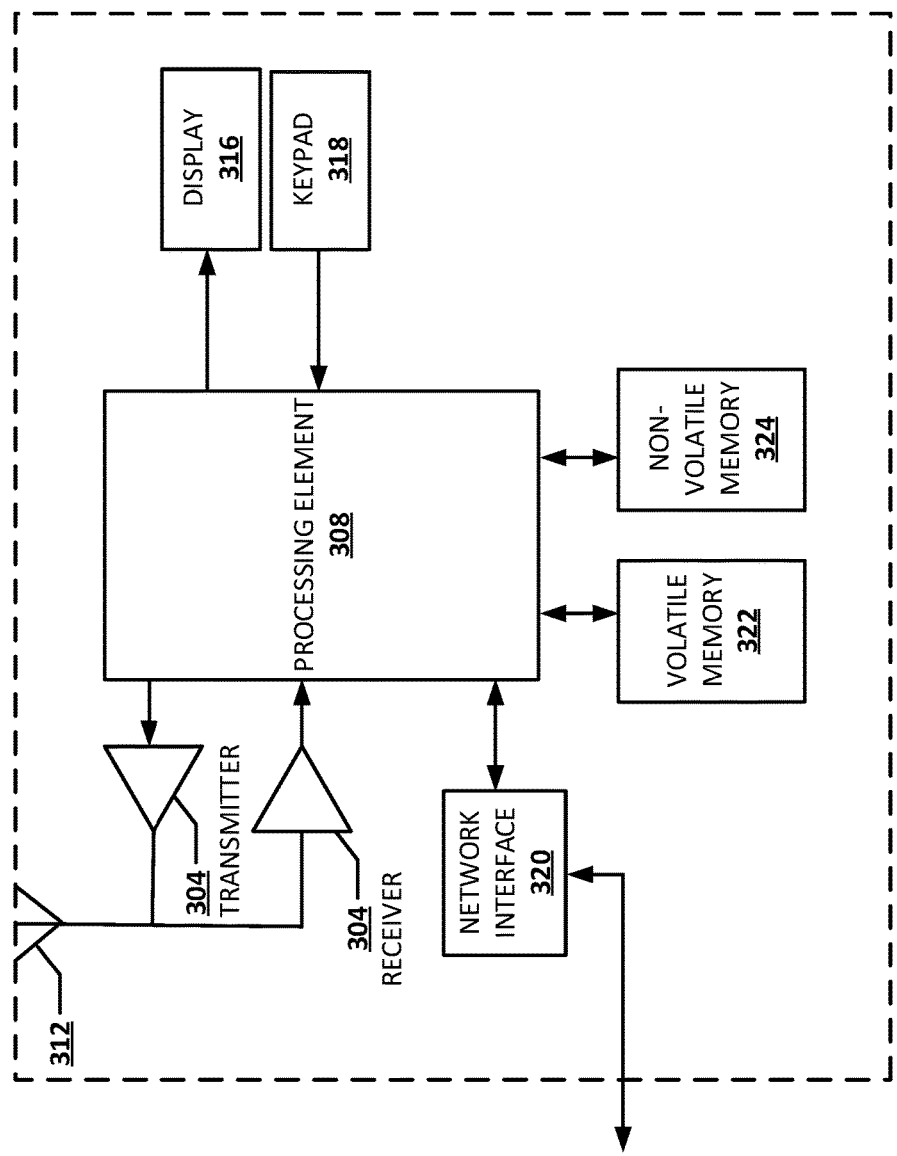

FIG. 3 provides an example external computing entity in accordance with some embodiments discussed herein.

Figure 4:
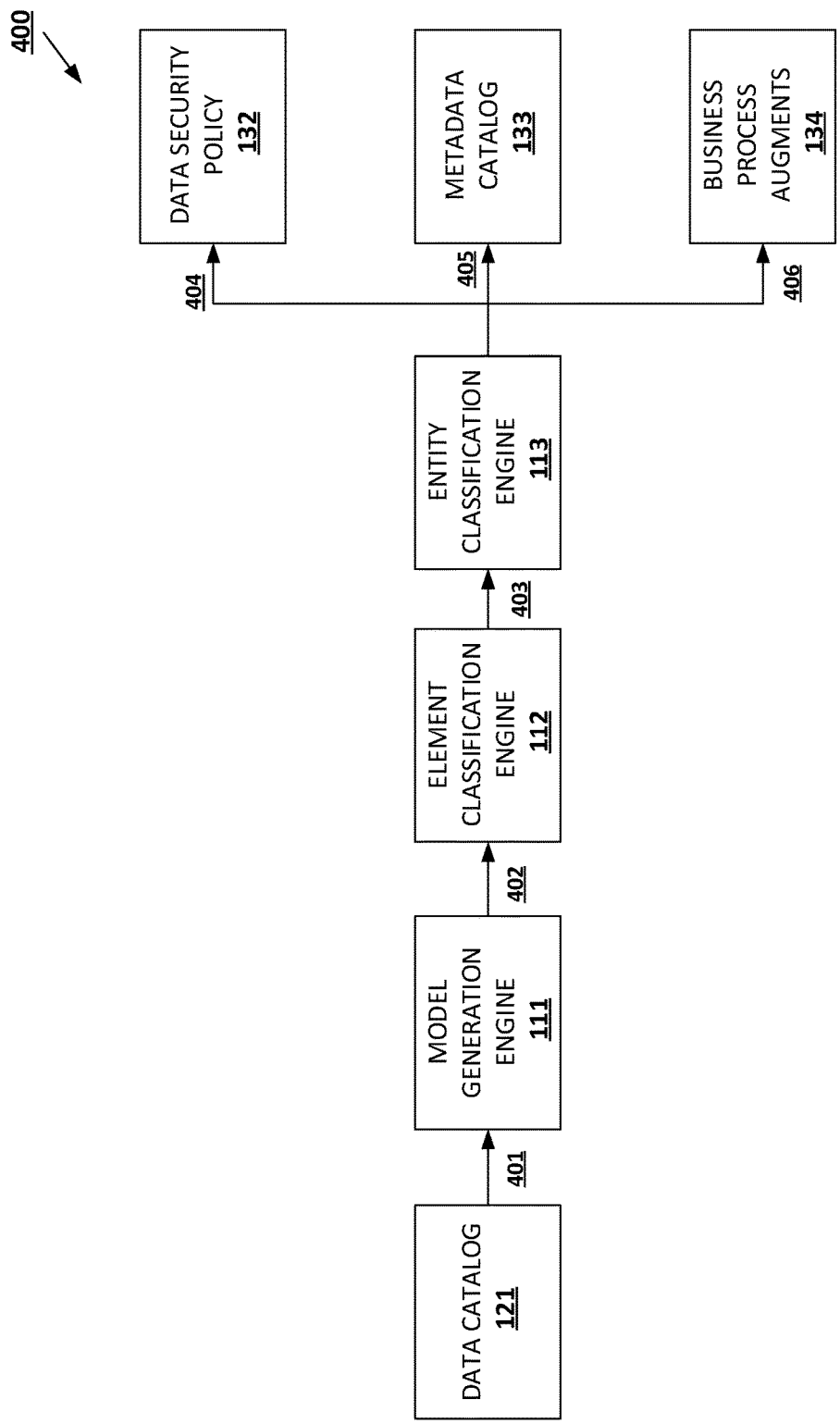

FIG. 4 is a data flow diagram of a process for generating sensitivity-based configuration information/data in accordance with some embodiments discussed herein.

Figure 5:
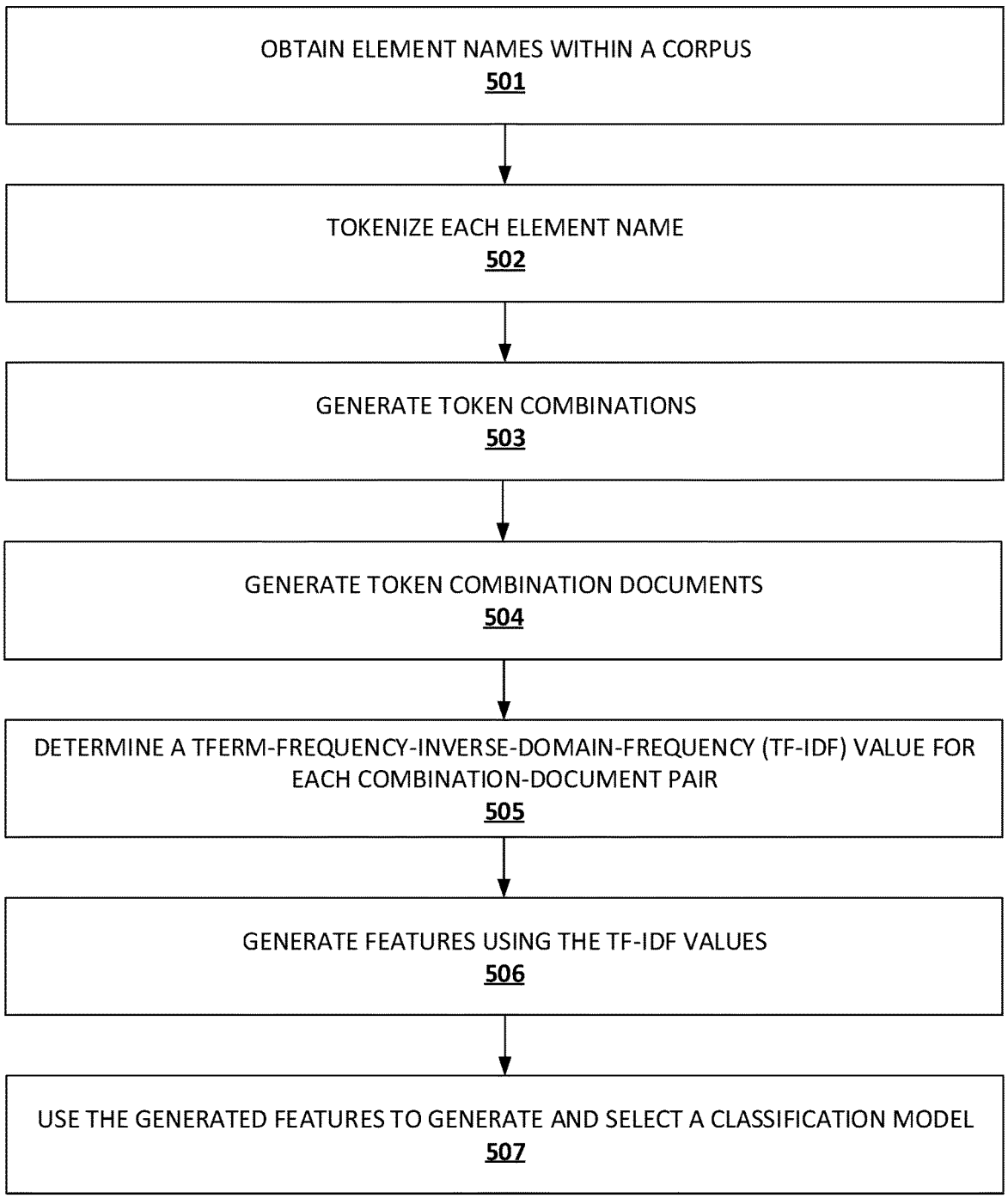

FIG. 5 is a flowchart diagram of a process for generating an optimal database entity sensitivity classification model in accordance with some embodiments discussed herein.

FIG. 6 provides an operational example of two database entities in accordance with some embodiments discussed herein.

FIG. 7 provides an operational example of database element tokens in accordance with some embodiments discussed herein.

FIG. 8 is a flowchart diagram of a process for selecting an optimal database entity sensitivity classification model based on element features in accordance with some embodiments discussed herein.

Figure 9:
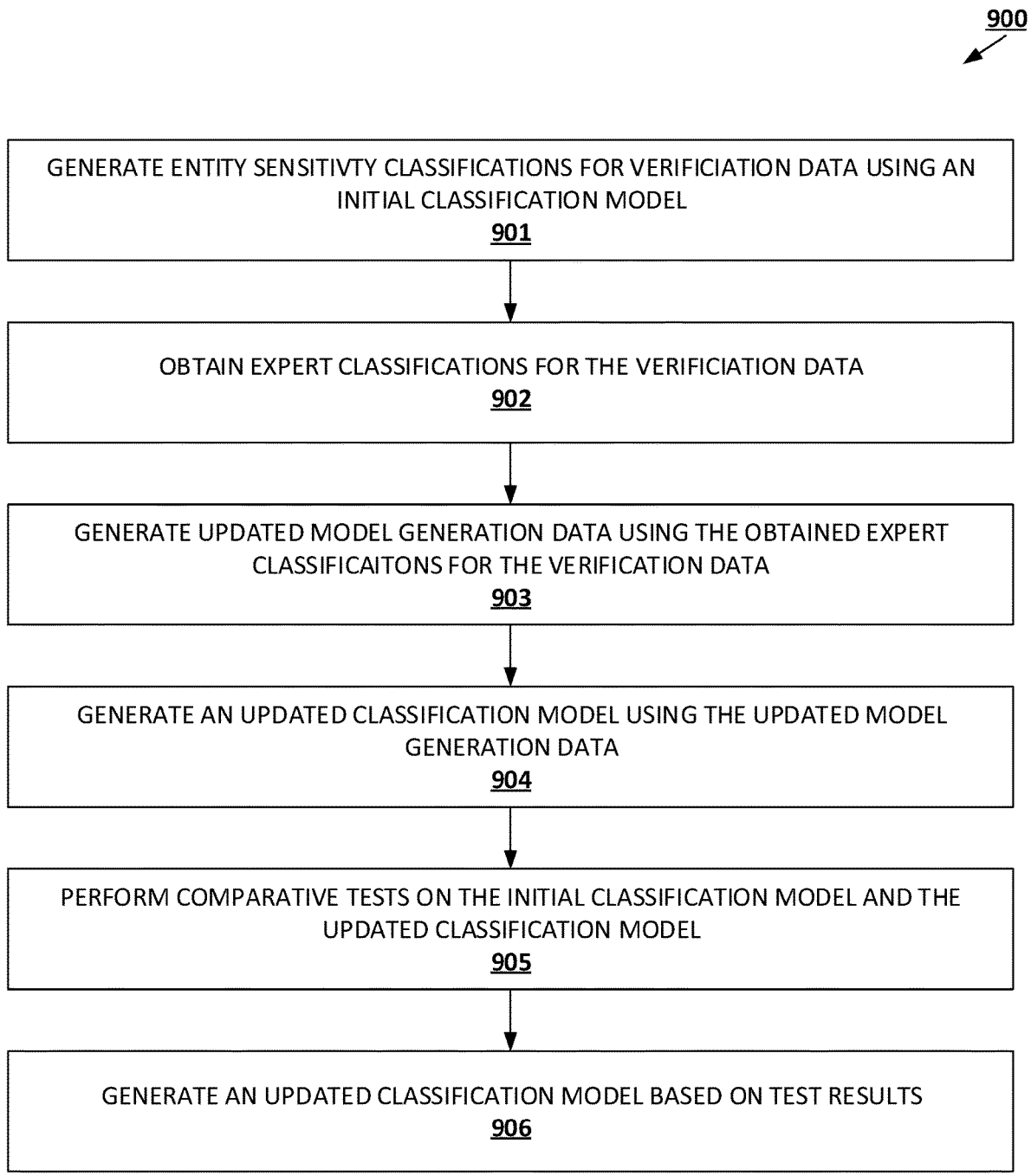

FIG. 9 is a flowchart diagram of a process for generating an updated database entity sensitivity classification model in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview

Discussed herein methods, apparatus, systems, computing devices, computing entities, and/or the like for database entity sensitivity classification, e.g., database entity classification by using database element identifiers (e.g., relational database column names) associated with database entities (e.g., relational database tables). As will be recognized, however, the disclosed concepts can be used to perform any type of database entity classification, such as database entity popularity classification, database entity usage frequency classification, database entity sentiment classification, and/or the like.

A. Technical Problems

Various embodiments of the present invention address technical challenges related to database entity sensitivity classification in large and complex database systems. Many institutions deal with data that can include potentially sensitive information/data. In many cases, such institutions need to determine what data in a database is sensitive and what data is not. This could be a difficult task that requires substantial predictive inference, especially as the size and complexity of data stored in a database grows. For example, many healthcare delivery and/or health insurance delivery institutions host large-scale databases with potentially sensitive information, such as patient health information/data and patient identifying information/data. For many of those healthcare delivery and/or health insurance delivery institutions, it is imperative to uphold company policies in the management of sensitive information/data by properly identifying sensitive information/data.

Despite this pressing technical need, many existing solutions for database entity sensitivity classification suffer from important security, reliability, and/or efficiency drawbacks. For example, many existing solutions for database entity sensitivity classification utilize insecure sensitivity classification methods. Indeed, some existing entity sensitivity classification solutions require access to the underlying data to be profiled, which potentially exposes sensitive information/data. Furthermore, many existing solutions for database entity sensitivity classification produce unreliable results. For example, some existing entity sensitivity classification solutions focus on identifying individual data attributes, a technique that can introduce high error rates requiring human intervention and prevent automation of database entity sensitivity classification. Moreover, many existing solutions for database entity sensitivity classification utilize inefficient sensitivity classification methods. In some cases, processing underlying data instead of database schema may require processing large sums of data, which could be time-consuming and resource-consuming. Therefore, because of the noted reasons, there continues to be a technical need for database entity sensitivity classification that have improved security, reliability, and/or efficiency features.

B. Technical Solutions

Various embodiments of the present invention generate database entity sensitivity classifications based on entity schema, such as based on names of elements in a database entity (e.g., names of columns in a relational table entity). This eliminates the need to analyze, and thus expose, underlying data, in turn enabling performing entity sensitivity classifications in a more secure manner. By eliminating the need to analyze underlying data to perform database entity sensitivity classifications, various embodiments also enable more efficient entity sensitivity classification. Indeed, various embodiments of the present invention identify entities or tables in which sensitive information/data exists with high confidence simply by utilizing data catalogs and without requiring access to the underlying data values for profiling. Through utilizing such techniques, various embodiments of the present invention perform entity sensitivity classifications without using confidential data, such as patient health information/data and/or patient identifying information/data. Thus, by generating database entity sensitivity classifications based on entity schema, various embodiments of the present invention address technical needs for improvements in security and efficacy of existing database entity sensitivity classification methods.

Furthermore, various embodiments of the present invention generate more reliable entity sensitivity classifications by tokenizing elements names within a database entity, combining generated tokens to generate token documents for database elements, and using corpus-based frequency values to generate descriptive features from database elements that can lead to reliable and accurate entity sensitivity classifications. By using the noted feature generation techniques, various embodiments of the present invention increase the size and/or dimensionality of data derived from each database element, thus enabling more accurate predictive inferences about entity sensitivity classification of various database entities. As a result of utilizing the noted feature generation techniques, various embodiments of the present invention generate near zero levels of false negative entity sensitivity classifications (i.e., instances of a failure to classify a sensitive entity as sensitive). Thus, by generating database entity sensitivity classifications based on token combination documents, various embodiments of the present invention address technical needs for improvements in reliability of existing database entity sensitivity classification techniques.

Moreover, various embodiments of the present invention generate more accurate results by utilizing a classification model selection techniques utilizing an expert feedback loop, such as subject matter expert (SME) feedback. By utilizing expert feedback to improve entity sensitivity classification models, various embodiments of the present invention generate more accurate more reliable entity sensitivity classifications without a need for custom creation of complex compliance rules or workflow modifications. Moreover, using expert feedback to improve entity sensitivity classification models has been shown to create increased accuracy of entity sensitivity classification models over a period of time. Thus, by using expert feedback to improve entity sensitivity classification models, various embodiments of the present invention address technical needs for improvements in reliability of existing database entity sensitivity classification techniques.

II. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. Exemplary System Architecture

The architecture 100 includes one or more external computing entities 102 that interact with a data analysis system 101 via a communication network (not shown). The data analysis system 101 includes a storage subsystem 108 and a data analysis computing entity 106. Each computing entity, computing subsystem, and/or computing system in the architecture 100 may include any suitable network server and/or other type of processing device. The communication network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

In some embodiments, the architecture 100 is configured to classify particular potentially sensitive information/data (e.g., potentially sensitive information/data stored in the storage subsystem 108 and/or potentially sensitive information/data obtained from an external computing entity 102) based on estimated and/or predicted degrees of sensitivity (e.g., degree of confidentiality and/or degree of proprietary nature) of such potentially sensitive information/data. In some embodiments, the architecture 100 is further configured to utilize the data sensitivity classifications to generate sensitivity-based configuration information/data, such as one or more of data security policy data, metadata catalog data, and/or business process augments data, as further described below. In some embodiments, the architecture 100 is further configured to process the potentially sensitive information/data in accordance with at least a portion of the sensitivity-based configuration information/data to provide end-user outputs to end-user profiles associated with at least some of the external computing entities 102. Examples of potentially sensitive information/data include patient identifying information/data and patient health information/data maintained by healthcare delivery institutions and/or health insurance provider institutions.

An external computing entity 102 may be an end-user computing entity associated with an end-user profile of the data analysis system 101 that is configured to provide end-user data requests for potentially sensitive information/data to the data analysis computing entity 106 as well as receive end-user outputs in response to the noted end-user requests by the end-user computing entity. An external computing entity 102 may also be an administrative computing entity associated with an administrator profile that is configured to provide system 101 management data (e.g., training configuration information/data) and/or underlying potentially sensitive information/data (e.g., health data catalogs) to the data analysis system 101.

For example, an external computing entity 102 may be a computing entity (e.g., a computing entity utilized by a medical practitioner) configured to provide requests for information/data from a data analysis system 101 associated with a healthcare delivery institution and/or a health insurance provider institutions. As another example, an external computing entity 102 may be a computing entity (e.g., a computing entity utilized by a software developer) configured to provide training parameters for one or more sensitivity classification models deployed by the data analysis system 101. As yet another example, an external computing entity 102 may be a computing entity (e.g., a computing entity utilized by a healthcare delivery institution) that is configured to provide patient identifying information/data and/or patient health information/data to a data analysis system 101 (e.g., a data analysis system 101 associated with a health insurance provider institution).

The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

The storage subsystem 108 may be configured to store one or more of a data catalog 121, a data security policy 132, a metadata catalog 133, and one or more business process augments 134. The data catalog 121 may include a collection of unstructured and/or structured data segments that may include potentially sensitive information/data. In some embodiments, the data catalog 121 includes data associated with one or more relational database tables, one or more graph-based database segments, and/or one or more object-oriented database segments. For example, the data catalog 121 may include one or more relational database tables and/or schema data associated with one or more relational database tables. In some embodiments, the data analysis computing entity 106 is configured to predict sensitivity of data in the data catalog 121 based on schema data associated with the data catalog 121.

In some embodiments, the data catalog 121 further includes ground-truth sensitivity labels for at least a portion of the potentially sensitive information/data stored as part of the data catalog 121. For example, the data catalog 121 may include schemas form m+n relational database tables along with ground-truth sensitivity labels form of the mentioned m+n relational database tables. In some embodiments, m is substantially smaller than n, thus leaving a substantial majority of the potentially sensitive schemas without a ground-truth sensitivity label and in need of sensitivity classification. In some embodiments, the data analysis computing entity 106 uses a portion of the m schemas and their associated ground-truth sensitivity labels for training and/or validating one or more sensitivity classification models associated with the data analysis computing entity 106. In some embodiments, the data catalog 121 includes model-generation data, i.e., data including element textual identifiers for each of plurality of database elements as well as a ground-truth sensitivity label for each of the plurality of database elements.

The data security policy 132 may include a collection of data elements configured to control access to the data catalog 121 based at least in part on sensitivity classification of information/data. For example, the data security policy 132 may enable a first category of users (e.g., a most-privileged category of users, such as system administrators)

general access to the data catalog 121 which allows the first category of users access to all of the data in the data catalog 121, a second category of users (e.g., a second-most-privileged category of users, such as qualified non-administrators including medical practitioners) qualified access to the data catalog 121 which allows the second category of users access to all of the data in the data catalog 121 except for system 101 configuration information/data (e.g., training data, such as ground-truth sensitivity labels), and a third category of users (e.g., a least-privileged category of users, such as general administrative staff) limited access to the data catalog 121 which allows the third category of users access to portions of the data catalog 121 not classified as sensitive. In general, a data security policy 132 may define one or more access parameters for data access requests based on one or more of sensitivity classification of data, identities of requesting users, identities of requesting computing entities utilized by requesting users, access request times, and/or the like.

The metadata catalog 133 may include a collection of data elements configured to indicate properties of at least a portion of the data in the data catalog 121, such as properties determined by the data analysis computing entity 106. For example, the metadata catalog 133 may include, for each relational database table of one or more relational database tables associated with the data catalog 121, a table sensitivity classification for the relational database table. As another example, the metadata catalog 133 may include, for each relational database column of one or more relational database columns associated with the data catalog, a column sensitivity classification for the relational database column. In some embodiments, one or more data security policies 132 may be defined based on database entity classifications (e.g., database entity sensitivity classifications) stored as part of one or more metadata catalogs 122.

The business process augments 134 may include a collection of data elements configured to instruct the data analysis computing entity 106 about how to utilize the metadata catalog 133 to perform one or more tasks related to the data catalog 121. For example, the business process augments 134 may instruct the data analysis computing entity 106 to, in the event of detecting a sensitivity classification of a first relational database table as sensitive when seeking to access non-sensitive information/data stored by the first relational database table, use an alternative relational database table to access the non-sensitive information/data. As another example, the business process augments 134 may instruct the data analysis computing entity 106 about how to utilize the data catalog 121 and the metadata catalog 133 to train one or more sensitivity classification models associated with the data analysis computing entity 106. As yet another example, the business process augments 134 may instruct the data analysis computing entity 106 about how to utilize the data catalog 121 and the metadata catalog 133 to process various end-user requests (e.g., end-user requests received from at least some of the external computing entities 102).

The data analysis computing entity 106 may include one or more of a model generation engine 111, an element classification engine 112, an entity classification engine 113, and an output generation engine 114. The model generation engine 111 may be configured to utilize the data catalog 121 to train one or more sensitivity classification models, validate the one or more trained sensitivity classification models, and select a most optimal of the one or more trained sensitivity classification models based on the validation results for the one or more trained sensitivity classification models. For example, the model generation engine 111 may be configured to utilize the data catalog 121 to train one or more of a natural language processing sensitivity classification model, a text mining sensitivity classification model, a machine learning sensitivity classification model, and a deep learning sensitivity classification model (e.g., a deep neural network model, such as a deep feed-forward neural network model, a deep convolutional neural network model, a deep recurrent neural network model, and/or the like).

The model generation engine 111 may be configured to train some sensitivity classification models by using labeled information/data in the data catalog 121, e.g., model-generation data in the data catalog 121. The model generation engine 111 may utilize one or more training algorithms, such as a gradient descent training algorithm, a gradient descent with backpropagation training algorithm, a gradient descent with backpropagation through time training algorithm, and/or the like. In some embodiments, the model generation engine 111 may, in addition to the data associated with the data catalog 121, utilize the data associated with the metadata catalog 133 to train one or more sensitivity classification models. In some embodiments, the model generation engine 111 may be configured to validate the one or more trained sensitivity classification models and select a most optimal of the one or more trained sensitivity classification models.

The element classification engine 112 may be configured to utilize the optimal sensitivity classification model generated by the model generation engine 111 to classify individual database elements associated with the data catalog 121. A database element may be any portion of a database entity, such as a relational database column in a relational database table and/or a relational database column identifier a relational database table schema. In some embodiments, to generate a sensitivity classification for a particular database element associated with the data catalog 121, the element classification engine 112 may be configured to process the particular database element in accordance an input format for the optimal sensitivity classification model generated by the model generation engine 111 to generate feature data for the optimal sensitivity classification model. The element classification engine 112 may further be configured to process the generated feature data by the sensitivity classification model to generate a predictive output which indicates a sensitivity classification for the particular database element.

The entity classification engine 113 may be configured to utilize the element sensitivity classifications generated by the element classification engine 112 to classify individual database entities associated with the data catalog 121. A database entity may be any self-contained collection of data in a database that describes one or more relations defined by plurality of database elements, such as a relational database table and/or a relational database table schema that defines one or more relations defined by one or more relational database columns. The entity classification engine 113 may be configured to process sensitivity classifications generated by the element classification engine 112 to classify individual database entities in accordance with one or more element sensitivity aggregation models. For example, in accordance with one element sensitivity aggregation model, a relational database table may be deemed to include sensitive information/data if the relational database table includes/columns that are deemed by the element classification engine 112 to be sensitive, where j may for example be one. As another example, in accordance with another element sensitivity aggregation model, a relational database table may be deemed to include sensitive information/data if, when processed by a machine learning framework associated with the element sensitivity aggregation model, the element sensitivity classifications for the relational database columns associated with the relational database table generate a machine learning output indicating that the relational database table is deemed to include sensitive information/data. The entity classification engine 113 may further be configured to process the generated entity sensitivity classification to generate sensitivity-based configuration information/data (e.g., one or more of at least one data security policy 132, at least one metadata catalog 133, and at least one business process augment 134).

The output generation engine 114 may be configured to utilize at least one of the element classifications generated by the element classification engine 112, the entity classifications generated by the entity classification engine 113, and/or at least a portion of the sensitivity-based configuration information/data generated by the entity classification engine 113 to provide one or more end-user outputs to an end-user profile, e.g., an end-user profile associated with an external computing entity 102. For example, in response to an end-user request for retrieval of particular data associated with the data catalog 121, the output generation engine 114 may process the particular data in accordance with the data security policy 132 to remove any sensitive information/data and thus provide a desensitized output to the requesting end-user request. As another example, in response to an end-user request for retrieval of particular data associated with the data catalog 121, the output generation engine 114 may process the particular data in accordance with the data security policy 132 to determine that the particular data includes sensitive information/data that the requesting end-user profile is not privileged to receive. In some of those embodiments, in response to determining that the particular data includes sensitive information/data that the requesting end-user profile is not entitled to receive, the output generation engine 114 may determine alternative information/data to provide to the requesting end-user based at least in part on the business process augments 134. The output generation engine 114 may further be configured to generate at least one of the data security policy 132, the metadata catalog 133, and the business process augments.

A. Exemplary Data Analysis Computing Entity

FIG. 2 provides a schematic of a data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the data analysis computing entity 106 may include or be in communication with one or more processing elements 205 (also referred to as processors, processing circuitry, and/or similar terms used herein interchangeably) that communicate with other elements within the data analysis computing entity 106 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the data analysis computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the data analysis computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the data analysis computing entity 106 with the assistance of the processing element 205 and operating system.

As indicated, in one embodiment, the data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the data analysis computing entity 106 may include or be in communication with one or more input elements, such as a keyboard input, a mouse input, a touch screen/display input, motion input, movement input, audio input, pointing device input, joystick input, keypad input, and/or the like. The data analysis computing entity 106 may also include or be in communication with one or more output elements (not shown), such as audio output, video output, screen/display output, motion output, movement output, and/or the like.

B. Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities 110 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the data analysis computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the data analysis computing entity 106 via a network interface 320.

Via these communication standards and protocols, the external computing entity 102 can communicate with various other entities using concepts such as Unstructured Supplementary Service Data (US SD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the user computing entity's 121 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the data analysis computing entity 106 and/or various other computing entities.

In another embodiment, the external computing entity 102 may include one or more components or functionality that are the same or similar to those of the data analysis computing entity 106, as described in greater detail above. As will be recognized, these architectures and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

IV. Exemplary System Operation

The operation of various embodiments of the present invention will now be described. As discussed herein, various embodiments are directed to systems and methods for database entity sensitivity classification. Various embodiments of the disclosed techniques enable entity sensitivity classification by using database element identifiers (e.g., relational database column names) associated with database entities (e.g., relational database tables).

Entity Sensitivity Classification

FIG. 4 depicts a data flow diagram of a process 400 for generating sensitivity-based configuration information/data for a data analysis system 101. The process 400 may be performed by a system of one or more computers, such as by the data analysis computing entity 106 of the data analysis system 101. Via the various steps/operations of process 400, the data analysis computing entity 106 can generate database element classifications, database entity classifications, as well as sensitivity-based configuration information/data such as a data security policy 132, a metadata catalog 133, and one or more business process augments 134.

At step/operation 401, the model generation engine 111 receives at least a portion of the data catalog 121, such as model-generation information/data. In some embodiments, the model-generation data is a labeled portion of the data catalog 121, e.g., a portion of the data catalog 121 that includes a textual identifier for each model-generation database element of one or more model-generation database elements as well as a ground-truth element sensitivity label for each model-generation database element of the one or more model-generation database elements. For example, the model-generation data may include a textual identifier and a ground-truth element sensitivity label for each database column. Thus, the portion of the data catalog 121 received by the model generation engine 111 may include data indicating that a relational database column with the textual identifier "SSN" is sensitive, while a relational database column with the textual identifier "No_of_Children" is not sensitive. In some embodiments, the model-generation data is in a structured and/or semi-structured format, such as in a JSON or a NOSQL format.

At step/operation 402, the model generation engine 111 generates an optimal sensitivity classification model based on the model-generation data received in step/operation 401 and provides the optimal sensitivity classification model to the element classification engine 112. In some embodiments, generating the optimal sensitivity classification model includes selecting the optimal sensitivity classification model from a group of untrained sensitivity classification models. In some of those embodiments, selecting the optimal sensitivity classification model from a group of untrained sensitivity classification models includes training each untrained sensitivity classification model using a first portion (e.g., two-thirds) of the model-generation data to generate a trained sensitivity classification model for the untrained sensitivity classification, applying each trained sensitivity classification model to a second portion (e.g., one-third) of the model-generation data to generate validation result data for the trained sensitivity classification model, and determining the optimal sensitivity classification from the trained sensitivity classification models based on the validation result data for each trained sensitivity classification model. In some embodiments, the model generation engine 111 determines an optimal sensitivity classification model based on model selection configuration information/data, e.g., model selection configuration information/data stored as part of the data catalog 121 or otherwise stored on the data storage subsystem 108.

In some embodiments, step/operation 402 may be performed in accordance with the various steps/operations of FIG. 5. As depicted in FIG. 5, at step/operation 501, the model generation engine 111 obtains one or more database element names within a corpus, where the corpus includes data associated with plurality of database elements (e.g., one or more related database elements, such as one or more relational database columns associated with the same relational database table and/or one or more relational database columns associated with the same relational database). A database element name may be an example of a database element textual identifier. For example, the element name may be a name for a relational database column (e.g., "first_name," "last_name," "ssn," and/or the like).

At step/operation 502, the model generation engine 111 tokenizes each database element name obtained in step/operation 501 to generate one or more element tokens for the database element. For example, the model generation engine 111 may tokenize the element name "first_name" to generate element tokens "first" and "name." In some embodiments, the model generation engine 111 tokenizes database element names based on presence of special characters or combinations of special characters (e.g., the whitespace character, the underline character, and/or the like) in the database element names. In some embodiments, the model generation engine 111 tokenizes database elements based on a semantic model of the database elements. For example, a particular semantic model may indicate that words in particular database elements in a database name have fixed and/or predefined sizes, thus allowing the model generation engine 111 to break element names to determine element token names associated with the database elements.

At step/operation 503, the model generation engine 111 generates token n-grams by combining element tokens that were generated in the step/operation 502. In some embodiments, the model generation engine 111 generates token n-grams by combining element tokens in a manner that preserves order, association, and relationship of those element tokens. Preserving the order of element tokens may require that, given an element name AB where A and B are both element tokens and where A precedes B in the element name, tokenizing the element name AB will not create a BA n-gram. Preserving the association and relationship of element tokens may require that, given an element name CD and an element name EF, tokenizing the two element names will not create cross-element tokens such as CE, CF, DE, or DF. In some embodiments, as a result of the order-preserving, association-preserving, and relationship-preserving n-gram generations, the model generation engine 111 can create a longer textual input domain for an element name without disrupting semantic properties indicated by the order of tokens in an element name and without creating n-grams that belong to two columns. The former outcome may enhance utility of feature extraction due to improved semantic precision in input domain construction, while the latter outcome may avoid complications associated with cross-element feature extraction. Thus, the two outcomes can enhance reliability and efficiency of feature extraction in entity sensitivity classification systems.

In some embodiments, the model generation engine 111 generates token n-grams of a size n or less, where n may for example be two. In embodiments where n=2, step/operation 503 may include generating token unigrams and bigrams that preserve order of element tokens, associations of element tokens, and relationships of element tokens. For example, given the element name "soc_sec_num" tokenized into "soc," "sec," and "num," the model generation engine 111 may generate the following token unigrams and bigrams: "soc," "sec," "num," "soc_sec," and "sec_num".

At step/operation 504, the model generation engine 111 generates a token document for each database element whose name was obtained in step/operation 501 by combining every token n-gram associated with the database element. In some embodiments, step/operation 504 may be performed based on the operational examples provided in FIGS. 6-7. In particular, FIG. 7 provides various token documents each associated with a database element depicted in FIG. 6. For example, token document 711 (which includes token n-grams "SOC," "SEC," "NUM," "SOC_SEC," and "SEC_NUM") includes token unigrams and bigrams associated with element name 611 of database entity 610 (i.e., element name "SOC_SEC_NUM"); token document 712 (which includes token n-grams "PHNE," "NUM," and "PHNE_NUM") includes token unigrams and bigrams associated with element name 612 of database entity 610 (i.e., element name "PHNE_NUM"); token document 713 (which includes token n-gram "ADDR") includes token unigrams and bigrams associated with element name 613 of database entity 610 (i.e., element name "ADDR"); token document 721 (which includes token n-grams "SOC," "SEC," and "SOC_SEC") includes token unigrams and bigrams associated with element name 621 of database 620 (i.e., element name "SOC_SEC"); token document 722 (which includes token n-grams "PATIENT," "NUM," and "PATIENT_NUM") includes token unigrams and bigrams associated with element name 622 of database entity 620 (i.e., element name "PATIENT_NUM"); and token document 723 (which includes token n-gram "DIAGNOSIS") includes token unigrams and bigrams associated with element name 623 of database entity 620 (i.e., element name "DIAGNOSIS").

At step/operation 505, the model generation engine 111 generates, for each pair of an n-gram of one or more index n-grams and a token document associated with a database element whose name was obtained in step/operation 503, a term-frequency-inverse-domain-frequency (TF-IDF) value. In some embodiments, the one or more index n-grams include the n-grams generated in step/operation 503. In some embodiments, in addition to the n-grams generated in step/operation 503, the one or more index n-grams include other n-grams associated with the database corpus identified as part of the step/operation 501. In some embodiments, the one or more index n-grams are determined based on indexing data stored on the storage subsystem 108, e.g., as part of the data catalog 121.

In some embodiments, the model generation engine 111 generates a TF-IDF value for each n-gram-document pair which may indicate a frequency of occurrence of the respective n-gram in the respective token document relative to frequency of occurrence of the respective n-gram in other token documents. The TF-IDF is thus an example of a corpus-based frequency measure that may generate a higher relative frequency for a rare term as opposed to a common term, thus generating features from text input data that have higher semantic relevance and classification utility. In some embodiments, TF-IDF value for a first token n-gram t and a first token document d in a database corpus c associated with multiple token documents may be calculated using the below formula $$W_d^t = TF_d^t * \log\frac{N}{D_t^F},$$

where $W_d^t$ is the TF-IDF value for the token n-gram t and token document d, $TF_d^t$ is the total number of occurrences of the token n-gram t in the token document d, $D_t^F$ is the number of token documents in the corpus c that contain the token n-gram t, and N is the total number of token documents in the corpus c. However, a person of ordinary skill in the art will recognize that the present invention may be implemented using other TF-IDF and/or corpus-based frequency measures without departing from the spirit of the invention.

At step/operation 506, the model generation engine 111 generates element features for the database elements whose name was obtained in step/operation 501 based on the TF-IDF values generated in step/operation 505. In some embodiments, generating element features includes generating a plurality of element feature entries for each database element, where each element feature entry of the plurality of element feature entries corresponds to an input format of a plurality of classification models. In some embodiments, generating element features includes generating a feature matrix that includes, for each index n-gram and each token document, the TF-IDF value for the pair of the particular index n-gram and the particular token document.

At step/operation 507, the model generation engine 111 selects the optimal sensitivity classification model based on the element features generated in step/operation 506 to. In some embodiments, the model generation engine 111 selects the optimal sensitivity model from a plurality of sensitivity classification models. In some embodiments, the model generation engine 111 uses the element features for each database element whose name was obtained in step/operation 501 along with a ground-truth element sensitivity label for the respective database elements determined based on the model-generation data in step/operation 401 to train the plurality of predictive models and select the optimal sensitivity classification model from the trained sensitivity classification models.

In some embodiments, step/operation 507 may be performed in accordance with the various steps/operations of FIG. 8. As depicted in FIG. 8, at step/operation 801, the model generation engine 111 uses a first portion (e.g., two-thirds) of the model-generation data and the corresponding element feature data generated in step/operation 506 to train each sensitivity classification model of a plurality of sensitivity classification models. In some embodiments, to train a sensitivity classification models, the model generation engine 111 uses the element feature data corresponding to a first portion of the model-generation data as training input and the ground-truth element sensitivity label for the first portion as the target training output.

For example, given particular model-generation data that includes three model-generation data entries {AB, Sensitive}, {CD, Sensitive}, {DF, Non-sensitive}, where each model-generation data entry has the format {corresponding element name, corresponding ground-truth element sensitivity label}, the model generation engine 111 may select (e.g., based on an ordered selection, based on a random selection, based on one or more selection rules, and/or the like) the first two model-generation data entries (e.g., database elements associated with the names AB and CD) as belonging to the first portion of the model-generation information/data. Then, the model generation engine 111 may determine the element feature data entries for each of AB and CD as a training inputs to sensitivity classification models. After an element classification model generates a model output for a training input, the model generation engine 111 may determine a measure of deviation between the model output and the ground-truth element sensitivity label for the corresponding training input and use the measure of deviation to adjust parameters of the particular element classification model.

At step/operation 802, the model generation engine 111 uses a second portion (e.g., one-third) of the model-generation data and corresponding element feature data to validate each trained sensitivity data in order to generate validation result data for each sensitivity classification model. In some embodiments, the model generation engine 111 first applies each trained sensitivity classification model on feature data entries associated with the second portion which were generated in step/operation 506 to generate a model output. Then, the model generation engine 111 compares the model output generated by each sensitivity classification model by processing a feature data entry to the ground-truth element sensitivity label associated with the feature data entry in the model-generation data to generate a comparison distance (e.g., a numeric distance, geometric distance, a distance generated using a machine learning model, and/or the like) for the sensitivity classification model's processing of the feature data entry. The model generation engine 111 then determines validation result data for each sensitivity classification model based on each comparison distance associated with the sensitivity classification model.

For example, if a trained sensitivity classification model determines that a first sensitive element is non-sensitive, a second sensitive element is sensitive, and a third non-sensitive element is non-sensitive, the model generation engine 111 may determine that the first and last model outputs have a comparison distance of −1, because they do not match the corresponding ground-truth element sensitivity label, while the second model output has a comparison distance of +1, because it matches the ground-truth element sensitivity label. Based on those comparison distances, the model generation engine 111 may determine that the particular trained sensitivity classification model has a validation result of (2*−1)+1=−1. The model generation engine 111 may then determine whether the particular trained sensitivity classification model is the optimal classification model based on comparing the validation result of the particular trained sensitivity classification model and the validation results of other trained and validated sensitivity classification models.

At step/operation 803, the model generation engine 111 selects the optimal sensitivity classification model based on the validation results. For example, the model generation engine 111 may select the sensitivity classification model having the highest validation result as the optimal sensitivity classification model. As another example, the model generation engine 111 may randomly select (e.g., based on a random probability distribution) a sensitivity classification model whose validation result exceeds a threshold as the optimal sensitivity classification model. As yet another example, the model generation engine 111 may select any sensitivity classification model whose validation result exceeds a threshold as an optimal sensitivity classification model. In some embodiments, the model generation engine 111 may select the optimal sensitivity classification model based on one or more optimal model selection rules that depend at least in part on the validation result for each sensitivity classification model of the plurality of sensitivity classification models.

Returning to FIG. 4, at step/operation 403, the element classification engine 112 processes plurality of database elements in accordance with the optimal sensitivity classification model to generate an element sensitivity classification for each of the plurality of database elements. The element classification engine 112 may retrieve data associated with the plurality of database elements from the data catalog 121. In some embodiments, the element classification engine 112 processes (e.g., one or more textual identifiers associated with the plurality of database elements) in accordance with one or more trained parameters of the optimal sensitivity classification model to generate an element sensitivity classification for each of the plurality of database elements. For example, the element classification engine 112 may process data associated with plurality of database elements in accordance with one or more trained parameters of an optimal sensitivity classification model by using a forward propagation algorithm associated with the optimal sensitivity classification model.

Returning to FIG. 4, at step/operation 404, the entity classification engine 113 generates data that may be used to generate the data security policy 132 for the data catalog 121 (e.g., the element sensitivity classifications generated in step/operation 403). In some embodiments, a computing engine processes the element sensitivity classifications in accordance with a data security policy generation model to generate the data security policy 132 for the data catalog 121. In some embodiments, the data security policy 132 includes a collection of data elements configured to control access to the data catalog 121 based at least in part on sensitivity classification of information/data. For example, the data security policy 132 may enable a first category of users (e.g., a most-privileged category of users, such as system administrators) general access to the data catalog 121 which allows the first category of users access to all of the data in the data catalog 121, a second category of users (e.g., a second-most-privileged category of users, such as qualified non-administrators including medical practitioners) qualified access to the data catalog 121 which allows the second category of users access to all of the data in the data catalog 121 except for system 101 configuration information/data (e.g., training data, such as ground-truth sensitivity labels), and a third category of users (e.g., a least-privileged category of users, such as general administrative staff) limited access to the data catalog 121 which allows the third category of users access to portions of the data catalog 121 not classified as sensitive. In general, a data security policy 132 may define one or more access parameters for data access requests based on one or more of sensitivity classification of data, identities of requesting users, identities of requesting computing entities utilized by requesting users, access request times, and/or the like.

Returning to FIG. 4, at step/operation 405, the entity classification engine 113 generates the metadata catalog 133 for the data catalog 121 based on the element sensitivity classifications generated in step/operation 403. In some embodiments, the entity classification engine 113 processes the element sensitivity classifications in accordance with a metadata catalog generation model to generate the metadata catalog 133 for the data catalog 121. In some embodiments, the metadata catalog 133 includes a collection of data elements configured to indicate properties of at least a portion of the data in the data catalog 121, such as properties determined by the data analysis computing entity 106. For example, the metadata catalog 133 may include, for each relational database table of one or more relational database tables associated with the data catalog 121, a table sensitivity classification for the relational database table. As another example, the metadata catalog 133 may include, for each relational database column of one or more relational database columns associated with the data catalog, a column sensitivity classification for the relational database column. In some embodiments, one or more data security policies 132 may be defined based on database entity classifications (e.g., database entity sensitivity classifications) stored as part of one or more metadata catalogs 122.

Returning to FIG. 4, at step/operation 406, the entity classification engine 113 generates the business process augments 134 for the data catalog 121 based on the element sensitivity classifications generated in step/operation 403. In some embodiments, the entity classification engine 113 processes the element sensitivity classifications in accordance with one or more business process augment generation models to generate the business process augments 134 for the data catalog 121. In some embodiments, the business process augments 134 include a collection of data elements configured to instruct the data analysis computing entity 106 about how to utilize the metadata catalog 133 to perform one or more tasks related to the data catalog 121. For example, the business process augments 134 may instruct the data analysis computing entity 106 to, in the event of detecting a sensitivity classification of a first relational database table as sensitive when seeking to access non-sensitive information/data stored by the first relational database table, use an alternative relational database table to access the non-sensitive information/data. As another example, the business process augments 134 may instruct the data analysis computing entity 106 about how to utilize the data catalog 121 and the metadata catalog 133 to train one or more sensitivity classification models associated with the data analysis computing entity 106. As yet another example, the business process augments 134 may instruct the data analysis computing entity 106 about how to utilize the data catalog 121 and the metadata catalog 133 to process various end-user requests (e.g., end-user requests received from at least some of the external computing entities 102).

Updating Entity Sensitivity Classification Models

FIG. 9 depicts a data flow diagram of a process 900 for generating an updated database entity sensitivity classification model. The process 900 may be performed by a system of one or more computers, such as by the data analysis computing entity 106 of the data analysis system 101. Via the various steps/operations of process 900, the data analysis computing entity 106 can generate updated database entity sensitivity classification models with enhanced parameters, such as generating updated database entity sensitivity classification models using SME feedback information/data.

At step/operation 901, the data analysis computing entity 106 generates entity sensitivity classifications for verification data using an initial entity classification model. In some embodiments, the data analysis computing entity 106 obtains verification data which include one or more verification data entities, where each verification data entity is associated with one or more verification data elements. For example, the data analysis computing entity 106 may obtain a portion of the model-generation data obtained in step/operation 401 as the verification information/data. As another example, the data analysis computing entity 106 may generate the verification data based on data indicating operation of the data analysis system 101 after selection of an optimal entity sensitivity classification model in step/operation 402. In some embodiments, the initial entity classification model is an optimal entity sensitivity classification model selected in step/operation 402. In some embodiments, to generate the entity sensitivity classifications for verification data using the initial entity classification model, the data analysis computing entity 106 processes the verification data using the initial entity classification model to generate the entity sensitivity classifications as outputs of the initial entity classification model.

At step/operation 902, the data analysis computing entity 106 obtains expert classifications for the verification information/data. In some embodiments, the data analysis computing entity 106 provides the verification data to at least one SME user profile (e.g., at least one SME user profile associated with the data analysis system 101 and/or an external computing entity 102) and obtains SME classifications from each SME user profile. In some of those embodiments, the data analysis computing entity 106 determines an expert classification for each verification data entry based on any SME classifications associated with the verification data entry.

At step/operation 903, the data analysis computing entity 106 generates updated model-generation data sing the obtained expert classification for the verification information/data. In some embodiments, the data analysis computing entity 106 generates new model-generation data entries that each include a textual identifier for a verification data entry and an expert classification for the verification data entry. In some embodiments, the data analysis computing entity 106 adds the new model-generation data entries to the model-generation data entries obtained in step/operation 401 to generate the updated model-generation information/data. In some embodiments, the data analysis computing entity 106 replaces the model-generation data entries obtained in step/operation 401 with the new model-generation data entries to generated the updated model-generation information/data.

At step/operation 904, the data analysis computing entity 106 generates an updated classification model using the updated model-generation information/data. In some embodiments, the data analysis computing entity 106 trains each entity sensitivity classification model using a first portion (e.g., two-thirds) of the updated model-generation data, validates each trained entity sensitivity classification model using a second portion (e.g., one-third) of the updated model-generation data to generate a validation result for each trained entity sensitivity classification model, and selects an updated classification model based on each validation result for a trained entity sensitivity classification model. In some embodiments, the data analysis computing entity 106 generates an updated classification model based on operations discussed in reference to step/operation 402 and by using the updated model-generation data as the model-generation data used to generate an optimal entity sensitivity classification model.

At step/operation 905, the data analysis computing entity 106 performs comparative tests on the initial classification model and the updated classification model to generate a test result for each of the initial classification model and the updated classification model. In some embodiments, the data analysis computing entity 106 provides test data (e.g., each test data comprising the verification data, the model-generation data, and/or the updated model-generation data) to each of the initial classification model and the updated classification model. The test data may include one or more test data entries, where each test data entry may include a textual identifier for a database element and a test sensitivity label for the database element. The data analysis computing entity 106 then obtains an output classification for each of the initial classification model and the updated classification model. The data analysis computing entity 106 then computes a test result for each of the initial classification model based on a difference between each output classification generated by each of those models and a corresponding test sensitivity label.

At step/operation 906, the data analysis computing entity 106 generates an updated classification model based on the test results obtained in step/operation 905. In some embodiments, the data analysis computing entity 106 selects, from the initial classification model and the updated classification model, the classification model having the highest test result as the updated classification model. In some embodiments, the data analysis computing entity 106 selects, from each of the initial classification model and the updated classification model whose test result exceeds a threshold, a randomly-selected classification based on the test result for each of the initial classification model and the updated classification model.

V. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for determining an entity sensitivity classification for a database entity comprising a plurality of database elements, the computer-implemented method comprising:
for each database element of the plurality of database elements,
generating, by one or more processors, one or more element tokens based at least in part on a textual identifier for the database element, generating, by the one or more processors, one or more token combinations based at least in part on the one or more element tokens for the database element and a token order associated with the textual identifier,
generating, by the one or more processors, a token-combination document based at least in part on the one or more token combinations for the database element, and
generating, by the one or more processors, element feature data for the database element based at least in part on the token-combination document for the database element;
generating an entity sensitivity classification model using a plurality of model-generation data entries, wherein (a) the entity sensitivity classification model is selected from a plurality of candidate classification models, (b) each candidate classification model of the plurality of candidate classification models is trained using a first portion of the plurality of model-generation data entries to generate a corresponding trained candidate model, (c) each trained candidate model is validated using a second portion of the plurality of model-generation data entries to generate a corresponding validation result, and (d) selecting the entity sensitivity classification model from the plurality of candidate classification models is performed based at least in part on each validation result; and
determining, by the one or more processors, the entity sensitivity classification based at least in part on each element feature data associated with a database element of the plurality of database elements and using the entity sensitivity classification model.

2. The computer-implemented method of claim 1, wherein generating element feature data for a database element of the plurality of database elements comprises:
identifying a plurality of index terms, wherein the plurality of index terms comprises each token combination associated with at least one database element of the plurality of database elements;
identifying a database corpus, wherein the database corpus comprises a plurality of corpus database documents and the plurality of corpus database documents comprise each token-combination document associated with a database element of the plurality of database elements,
determining, for each combination-document pair comprising an index term of the plurality of index terms and a corpus database document of the plurality of corpus database document, (a) a corpus-based frequency measure based at least in part on a document-based frequency of the index term in the corpus database document and (b) a cross-document frequency of the index term in the plurality of corpus database documents; and
generating the element feature data based at least in part on each corpus-based frequency measure associated with the database element.

3. The computer-implemented method of claim 2, wherein each corpus-based frequency measure is a term-frequency inverse-domain-frequency (TF-IDF) measure.

4. The computer-implemented method of claim 1, wherein determining the entity sensitivity classification based at least in part on each element feature data comprises:
generating an entity feature matrix based at least in part on each element feature data; and processing the entity feature matrix based at least in part on one or more model trainable parameters associated with the entity sensitivity classification model to generate the entity sensitivity classification.

5. The computer-implemented method of claim 1, wherein the entity sensitivity classification model is a natural language processing model.

6. The computer-implemented method of claim 1, further comprising generating an updated entity sensitivity classification model, wherein generating the updated entity sensitivity classification model comprises:
obtaining verification data comprising one or more verification data entities each associated with one or more verification data elements;
processing the verification data using the entity sensitivity classification model to generate inferred entity sensitivity classification data comprising an inferred entity sensitivity classification for each verification data entity of the one or more verification data entities;
obtaining expert entity sensitivity classification data comprising an expert sensitivity classification for each for each verification data entity of the one or more verification data entities;
generating new model-generation data based at least in part on the verification data and the expert sensitivity classification data;
generating a candidate entity sensitivity classification model based at least in part on at least in part on the new model-generation data;
processing test input data comprising one or more test data entities using the entity sensitivity classification model to generate first test output data for the entity sensitivity classification model;
processing the test input data using the candidate entity sensitivity classification model to generate second test output data for the candidate entity sensitivity classification model,
comparing each of the first test output data and the second test result data to test target output data associated with the test input data to generate first test result data for the entity sensitivity classification model and second test result data for the candidate entity sensitivity classification model; and
determining the updated entity sensitivity classification model based at least in part on the first test result data and the second test result information/data.

7. The computer-implemented method of claim 1, wherein the database entity is a relational database table and each database element of the plurality of database elements is a relational database column in the relational database table.

8. An apparatus comprising at least one processor and at least one non-transitory memory comprising program code, wherein the at least one non-transitory memory and the program code are configured to, with the at least one processor, cause the apparatus to:
for each database element of a plurality of database elements,
generate one or more element tokens based at least in part on a textual identifier for the database element,
generate one or more token combinations based at least in part on the one or more element tokens for the database element and a token order associated with the textual identifier,
generate a token-combination document based at least in part on the one or more token combinations for the database element, and generate element feature data for the database element based at least in part on the token-combination document for the database element;

generate an entity sensitivity classification model using a plurality of model-generation data entries, wherein (a) the entity sensitivity classification model is selected from a plurality of candidate classification models, (b) each candidate classification model of the plurality of candidate classification models is trained using a first portion of the plurality of model-generation data entries to generate a corresponding trained candidate model, (c) each trained candidate model is validated using a second portion of the plurality of model-generation data entries to generate a corresponding validation result, and (d) selecting the entity sensitivity classification model from the plurality of candidate classification models is performed based at least in part on each validation result; and determine the entity sensitivity classification based at least in part on each element feature data associated with a database element of the plurality of database elements and using the entity sensitivity classification model.

9. The apparatus of claim 8, wherein generating element feature data for a database element of the plurality of database elements comprises:

identifying a plurality of index terms, wherein the plurality of index terms comprises each token combination associated with at least one database element of the plurality of database elements;

identifying a database corpus, wherein the database corpus comprises a plurality of corpus database documents and the plurality of corpus database documents comprise each token-combination document associated with a database element of the plurality of database elements, determining, for each combination-document pair comprising an index term of the plurality of index terms and a corpus database document of the plurality of corpus database document, (a) a corpus-based frequency measure based at least in part on a document-based frequency of the index term in the corpus database document and (b) a cross-document frequency of the index term in the plurality of corpus database documents; and generating the element feature data based at least in part on each corpus-based frequency measure associated with the database element.

10. The apparatus of claim 9, wherein each corpus-based frequency measure is a term-frequency inverse-domain-frequency (TF-IDF) measure.

11. The apparatus of claim 8, wherein determining the entity sensitivity classification based at least in part on each element feature data comprises:

generating an entity feature matrix based at least in part on each element feature data; and processing the entity feature matrix based at least in part on one or more model trainable parameters associated with the entity sensitivity classification model to generate the entity sensitivity classification.

12. The apparatus of claim 8, wherein the entity sensitivity classification model is a natural language processing model.

13. The apparatus of claim 8, further comprising generating an updated entity sensitivity classification model, wherein generating the updated entity sensitivity classification model comprises:

obtaining verification data comprising one or more verification data entities each associated with one or more verification data elements;

processing the verification data using the entity sensitivity classification model to generate inferred entity sensitivity classification data comprising an inferred entity sensitivity classification for each verification data entity of the one or more verification data entities;

obtaining expert entity sensitivity classification data comprising an expert sensitivity classification for each for each verification data entity of the one or more verification data entities;

generating new model-generation data based at least in part on the verification data and the expert sensitivity classification data;

generating a candidate entity sensitivity classification model based at least in part on at least in part on the new model-generation data;

processing test input data comprising one or more test data entities using the entity sensitivity classification model to generate first test output data for the entity sensitivity classification model;

processing the test input data using the candidate entity sensitivity classification model to generate second test output data for the candidate entity sensitivity classification model, comparing each of the first test output data and the second test result data to test target output data associated with the test input data to generate first test result data for the entity sensitivity classification model and second test result data for the candidate entity sensitivity classification model; and determining the updated entity sensitivity classification model based at least in part on the first test result data and the second test result information/data.

14. The apparatus of claim 8, wherein the database entity is a relational database table and each database element of the plurality of database elements is a relational database column in the relational database table.

15. A non-transitory computer storage medium comprising instructions configured to cause one or more processors to at least at least perform:

for each database element of a plurality of database elements, generate one or more element tokens based at least in part on a textual identifier for the database element, generate one or more token combinations based at least in part on the one or more element tokens for the database element and a token order associated with the textual identifier, generate a token-combination document based at least in part on the one or more token combinations for the database element, and generate element feature data for the database element based at least in part on the token-combination document for the database element;

generate an entity sensitivity classification model using a plurality of model-generation data entries, wherein (a) the entity sensitivity classification model is selected from a plurality of candidate classification models, (b) each candidate classification model of the plurality of candidate classification models is trained using a first portion of the plurality of model-generation data entries to generate a corresponding trained candidate model, (c) each trained candidate model is validated using a second portion of the plurality of model-generation data entries to generate a corresponding validation result, and (d) selecting the entity sensitivity classification model from the plurality of candidate classification models is performed based at least in part on each validation result; and determine the entity sensitivity classification based at least in part on each element feature data associated with a database element of the plurality of database elements and using the entity sensitivity classification model.

16. The non-transitory computer storage medium of claim 15, wherein generating element feature data for a database element of the plurality of database elements comprises:

identifying a plurality of index terms, wherein the plurality of index terms comprises each token combination associated with at least one database element of the plurality of database elements;

identifying a database corpus, wherein the database corpus comprises a plurality of corpus database documents and the plurality of corpus database documents comprise each token-combination document associated with a database element of the plurality of database elements, determining, for each combination-document pair comprising an index term of the plurality of index terms and a corpus database document of the plurality of corpus database document, (a) a corpus-based frequency measure based at least in part on a document-based frequency of the index term in the corpus database document and (b) a cross-document frequency of the index term in the plurality of corpus database documents; and generating the element feature data based at least in part on each corpus-based frequency measure associated with the database element.

17. The non-transitory computer storage medium of claim 16, wherein each corpus-based frequency measure is a term-frequency inverse-domain-frequency (TF-IDF) measure.

* * * * *

UNITED STATES PATENT AND TRADEMARK OFFICE
CERTIFICATE OF CORRECTION

PATENT NO. : 11,062,043 B2
APPLICATION NO. : 16/400476
DATED : July 13, 2021
INVENTOR(S) : Binkley et al.

Page 1 of 1

It is certified that error appears in the above-identified patent and that said Letters Patent is hereby corrected as shown below:

In the Claims

<u>Column 28</u>
Line 42, Claim 15 Line 3, "to at least at least perform" should read --to at least perform--

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*